United States Patent [19]

Voith

[11] Patent Number: 4,653,537

[45] Date of Patent: Mar. 31, 1987

[54] FLUID FLOW DIVERTER VALVE WITH IMPROVED CHAMBER ARRANGEMENT

[75] Inventor: Donald J. Voith, Milwaukee, Wis.

[73] Assignee: Water Services of America, Inc., Milwaukee, Wis.

[21] Appl. No.: 841,854

[22] Filed: Mar. 20, 1986

[51] Int. Cl.[4] ............................................. F16K 11/02
[52] U.S. Cl. ........................... 137/625.43; 137/625.47
[58] Field of Search ....................... 137/625.43, 625.47

[56] References Cited

U.S. PATENT DOCUMENTS

| | | |
|---|---|---|
| 3,319,710 | 5/1967 | Heeren et al. . |
| 3,973,592 | 8/1976 | Cleaver et al. . |
| 4,445,540 | 5/1984 | Baron et al. . |
| 4,506,703 | 3/1985 | Baron . |
| 4,520,847 | 6/1985 | Baron . |
| 4,543,996 | 10/1985 | Baron . |

FOREIGN PATENT DOCUMENTS 3340400 12/1985 Fed. Rep. of Germany .

Primary Examiner—Gerald A. Michalsky
Attorney, Agent, or Firm—Andrus, Sceales, Starke & Sawall

[57] ABSTRACT

A diverter valve (1) includes a rotatable axially shiftable element (21) disposed within a housing (10) having a cylindrical wall (11), end walls (12, 14) and four cage bars (42-45). The element has channel plates. One channel plate (29) is disposed adjacent one housing end wall. The other channel plate (30) is disposed intermediate the housing end walls. An end plate (33) is spaced from plate (30) on the side remote from plate (29) and is disposed adjacent the other housing end wall. A tapered plug (27) joins the channel plates and joins plate (30) with end plate (33). Channel walls (34, 35) are spaced outwardly from the plug mounted to the housing wall (11) and extend inwardly between cage bars, with Segmental platforms (50, 51) are their inner edges (52, 53) receiving the edges of channel plate (30) when the diverter assembly (21) is in one position. When the assembly is in normal position, plug (27) is sealed against cage bars (42, 44). Quadrants formed by the cage bars form axial chambers (A-D). Adjacent chambers on each plug side are in communication. Fluid flow is generally straight-through on each plug side. In reverse position, platforms (50, 51) are sealed against plate (30) and walls (34, 35) are sealed against cage bar edges, forming opposed axially extending chambers (E, F). Pairs of transverse axially adjacent chambers are sealed from each other, and are designated as upper (J, L) and lower (K, M) chambers. The lower chambers communicate with axially extending chambers (E, F).

6 Claims, 14 Drawing Figures

NORMAL

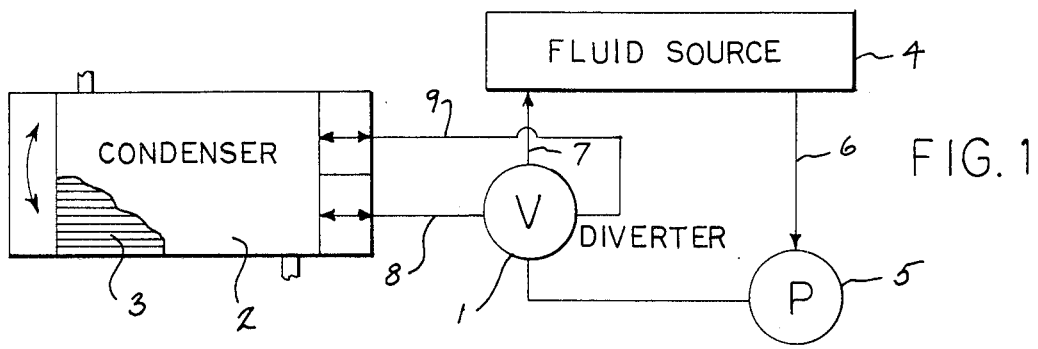
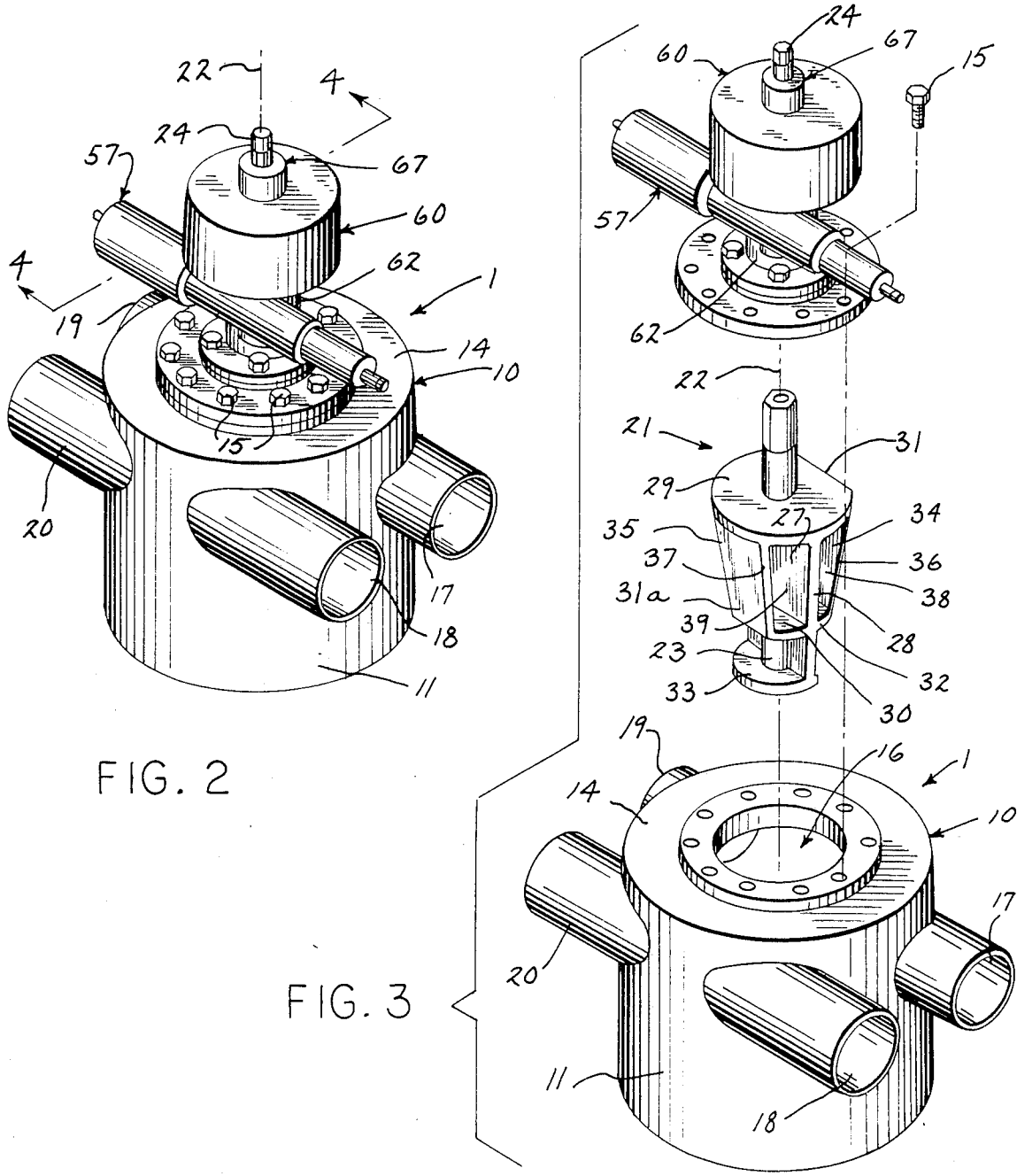

NORMAL

NORMAL

NORMAL FLOW

REVERSE FLOW

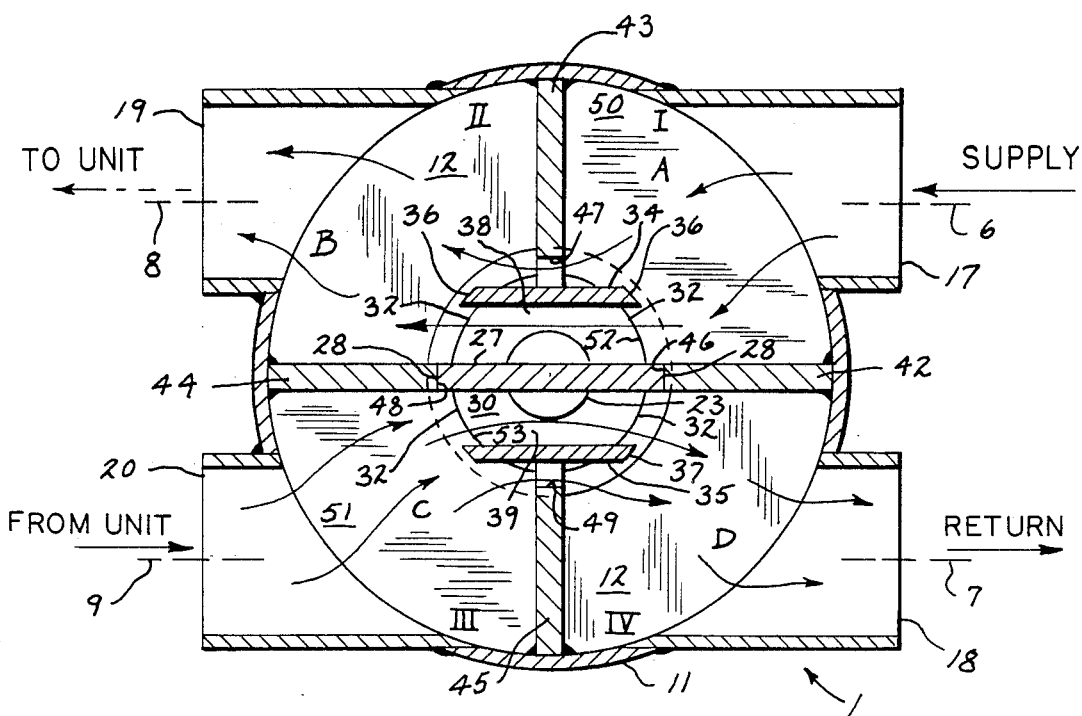
FIG. 8
NORMAL FLOW
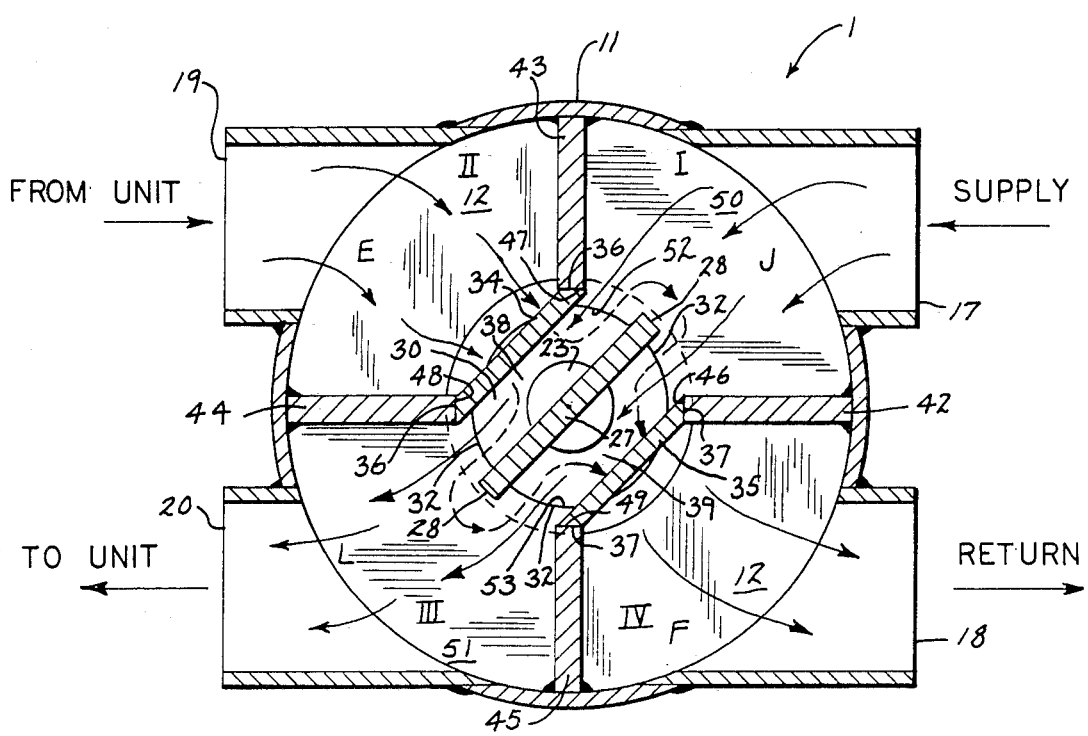
FIG. 9 REVERSE FLOW

REVERSE FLOW

FLUID FLOW DIVERTER VALVE WITH IMPROVED CHAMBER ARRANGEMENT

PRIOR ART OF INTEREST

| Patent No. | Inventor | Issued |
|---|---|---|
| 3,319,710 | Heeren et al | May 16, 1967 |
| 3,973,592 | Cleaver et al | August 10, 1976 |
| 4,445,540 | Baron et al | May 1, 1984 |
| 4,506,703 | Baron | March 26, 1985 |
| 4,520,847 | Baron | June 4, 1985 |
| 4,543,996 | Baron | October 1, 1985 |
| German DE3340400 | Vogler | December 19, 1985 |

BACKGROUND AND SUMMARY OF THE INVENTION

This invention relates to a fluid flow diverter valve with an improved chamber arrangement.

It has previously been suggested that heat exchanger tubing may be internally cleaned by mounting brush-basket assemblies on the ends of the tubes, and then by flowing fluid first in one direction and then the other to cause the brushes to traverse the length of the tubes and then return to their original position. See the above-identified U.S. Pat. No. 3,319,710.

It has also been previously suggested as in the above U.S. Pat No. 3,973,592 to utilize a fourway diverter valve for purposes of reversing fluid flow within the tubes to cause the cleaning brushes to move in both directions within the tubes. In diverter valves of the '592 type a butterfly valve element having head members joined by a central plug is rotatable between normal and reverse flow positions. Four cage bars are circumferentially spaced and form pairs of opposed seats for sealing engagement with the two edges of the valve plug to connect various chambers within the valve housing with upstream and downstream fluid flow lines, depending on the rotary position of the valve element. Valves of this type have been considered subject to a number of disadvantages, namely complexity of the structure and fluid flow paths.

A more recently developed diverter valve has been thought to solve some of the problems of the valve of the '592 patent. The "pipe" valve of U.S. Pat. No. 4,506,703 utilizes no cage bars, but instead a tubular diverter having a central diametrical baffle. However, the construction of the '703 patent has been found to sometimes have distortion of the primary parts.

The German Vogler Patent DE 3340400 is also of some interest in that it discloses a fourway diverter valve which utilizes two concentric cylinders together with axially spaced chambers. This construction, however, is subject to binding problems upon relative rotation of the cylinders.

U.S. Pat. No. 4,543,996 discusses all the above U.S. patents in depth, the discussion being incorporated herein by reference. This '996 patent is indicated as presenting an improvement over the said '592 patent, and discloses a valve having a modified tapered plug with pipe segments mounted thereon as well as a pair of stub pipes which are welded to and extend inwardly from the housing walls for selective engagement with the pipe segment ends.

A problem has been perceived with the construction of the aforesaid U.S. Pat. No. 4,543,996. The stub pipes are intended to be welded to the inside of the valve housing walls so that they are aligned with diagonally positioned upstream and downstream fluid flow openings in the housing wall. The openings must be large enough to encompass the entire stub pipes, and as a result, the openings are often made larger than heretofore. At the same time, port-like nozzles are welded to the outside of the housing walls for connection to the fluid supply and a process device, such as a heat exchanger. These nozzles align with the wall openings also, but from the opposite side from the stub pipes. The stub pipes and nozzles are normally installed permanently at the point of valve manufacture. The outer ends of the stub pipes are adjusted to align with the now enlarged housing openings. In some field situations, this may be difficult if not impossible.

As a result, it has recently been suggested to eliminate the problems of the '996 valve by returning to a fourway diverter valve having four cage bars, together with a tapered valve element plug forming part of a rotatable diverter assembly. This suggested device has not been built but is known through a prior publication of a drawing, and is described hereinafter in more detail as "prior art". The assembly of the suggested device has a central portion formed with dual flow-through channels. The channel ends are delineated by a pair of annular transverse channel plates. Furthermore, a pair of annular transverse end plates are spaced axially outwardly from the respective channel plates. The plug has outer end portions which extend between adjacent channel and end plates, thus forming two fluid flow chambers at each end of the valve. In the return flow mode, fluid from the process device is split into two upper and two lower paths by the pairs of end chambers, before joining together for discharge through the return nozzle. Two pairs of axially spaced segmental plates are mounted to extend inwardly from the valve housing walls, with the channel plate edges sealingly engaging the arcuate surfaces of the segmental plates. Other features include sealing of the end plate edges at the housing end walls.

The known suggested device has also been found to be unduly complex, and due to the large number of facing elements which are in close proximity and which must slide past each other when changing between normal and reverse flow modes, undesirably high frictional or binding or sticking forces may occur. In addition, when the valve element is pre-set axially within the housing, the seal between abutting channel plates and segmental plates may be broken.

It is an aim of the invention to simplify the known suggested device, to reduce its cost and to make it of fewer parts and lighter in weight. It is a further aim to substantially reduce the tortuous fluid flow in the return mode, and to reduce undesirable friction by providing less slideable surfaces proximate each other. Yet another aim is to provide for axial pre-setting wherein sealing is not lost. It is an aim to accomplish all the above without losing the advantages of the known suggested device.

Generally, the various aims of the invention are accomplished by removing the fluid flow chambers at one end of the rotatable diverter assembly. The chamber removal is accompanied by removal of the end plate and tapered plug end portion thereat. The shape of the channel plates has also been changed. The aims are further accomplished by removal of the pair of segmental housing plates adjacent the removed end plate. The result is that all fluid flow in the return mode will be directed solely to one end of the valve element. The remaining central channels and opposite end chambers are dimensionally extended to replace the removed chambers so that the valve housing dimensions can be unchanged from the known suggested device. The aims are further accomplished by making the relationship between the edges of the remaining abutting channel plate and segmental plates of a thickness such that the effective seal therebetween is not lost when the diverter assembly is pre-set axially to set the clearance between the plug and cage bar seal surfaces.

In accordance with the various aspects of the invention, a fourway diverter valve includes a rotatable and axially shiftable diverter assembly disposed within a valve housing having a cylindrical wall and end walls as well as four circumferentially spaced cage bars. The diverter assembly is mounted on central stub shafts defining a longitudinal axis, and includes a pair of axially spaced transverse channel plates. One channel plate is disposed closely adjacent one housing end wall, while the other channel plate is disposed intermediate the housing end walls. In the present embodiment a third, or end, plate is transversely disposed on the said axis and spaced from the intermediate channel plate on the side remote from the end channel plate. The end plate is disposed adjacent the other housing end wall.

In the embodiment shown, a centrally disposed longitudinal tapered plug extends from end-to-end of the diverter assembly, joining the channel plates and also joining the intermediate channel plate with the end plate. The construction includes a pair of longitudinal generally flat channel walls spaced transversely outwardly from the plug and generally parallel to each other and the plug. Thus, a pair of side-by-side fluid flow channels are created intermediate the ends of the valve element.

A pair of diametrically opposed segmental plates or platforms are mounted to the cylindrical housing wall and extend radially inwardly between pairs of cage bars, with their inner edges being concave to receive the edges of the intermediate channel plate when the diverter assembly is in one of its positions.

When the diverter assembly is in its normal position, the plug is sealed against diametrically opposed cage bars, and the platforms and channel outer walls are not in full sealing relationship with the valve structure. The result is that all four quadrants formed by the cage bars form axial chambers which effectively extend from one end of the valve housing to the other. Adjacent chambers on each side of the plug communicate with each other. The fluid flow is generally straight through each side of the plug.

In the reverse position, the plug is not sealed but the platforms are sealed against the intermediate channel plate and the channel outer walls are sealed against the cage bar edges. The result is to form two opposed axially extending chambers which extend from end-to-end of the valve housing. In addition, there are formed pairs of transverse axially adjacent chambers which are sealed from each other, and which may be designated as upper and lower chambers. One of the axially adjacent chambers, such as the lower one, communicates with the axially extending chambers. One fluid flow path extends unidirectionally through the upper chamber, crossing opposing quadrants. The other fluid flow path is such that the fluid enters one axially extending chamber, all of the fluid hence flowing axially to the bottom chamber and around the cage bar edges and plug in both clockwise and counterclockwise directions and hence into the other axially extending chamber for discharge.

Means are provided to rotate the diverter assembly between normal and reverse positions and also to axially lift the assembly from engagement with the housing components during rotation to prevent frictional binding therebetween. The relative thickness of the oftentimes abutting channel plate and platform edges is such that effective sealing between the edges of the channel plate and platforms is not essentially lost in the reverse when there is an axial preset of the diverter assembly.

BRIEF DESCRIPTION OF THE DRAWINGS

The accompanying drawings illustrate the best mode presently contemplated by the inventor for carrying out the invention.

In the drawings:

FIG. 1 is a schematic showing of a heat exchange system to which the fluid flow diverter valve of the present invention may be applied;

FIG. 2 is a perspective view of the diverter valve of the present invention;

FIG. 3 is an exploded view of the valve of FIG. 2;

FIG. 8 is a horizontal section taken on line 8—8 of FIG. 5, with the assembly in normal position;

FIG. 9 is a view similar to FIG. 8 with the assembly in reverse position;

DESCRIPTION OF THE PREFERRED EMBODIMENT

Figure 4:
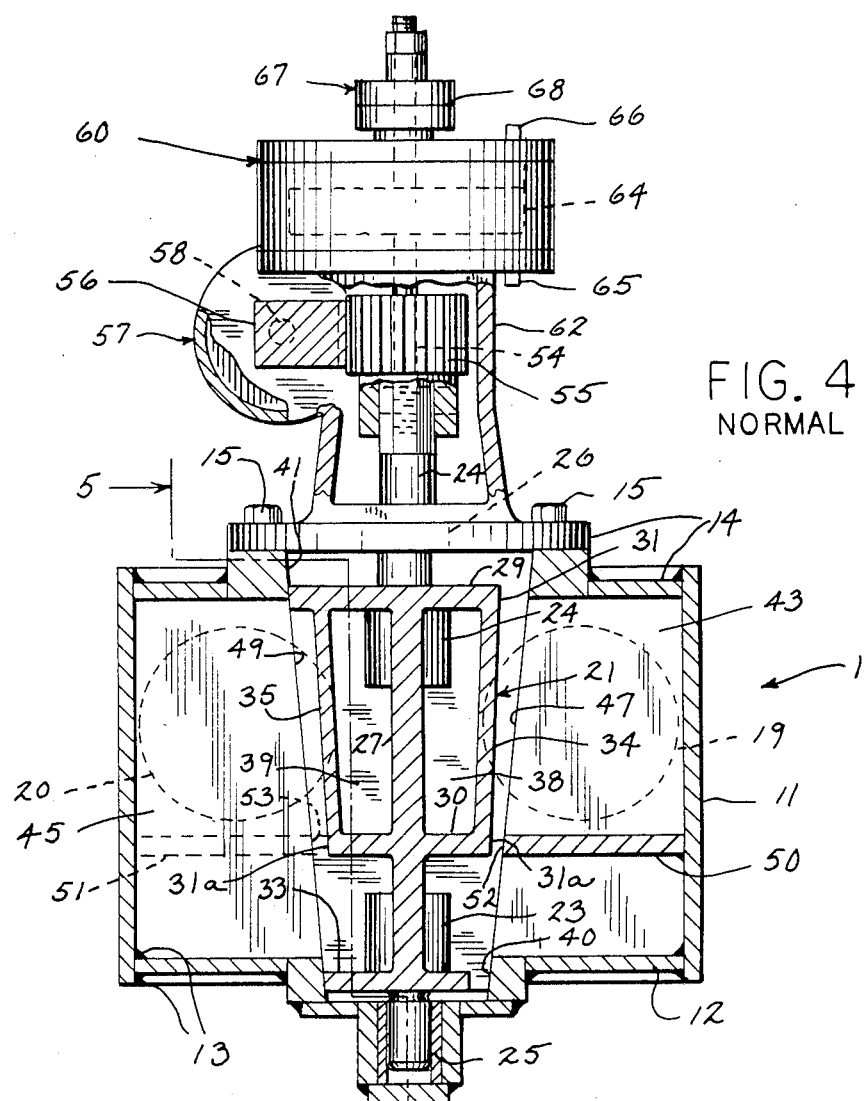
FIG. 4 is a vertical section taken on line 4—4 of FIG. 2 with the diverter assembly in normal fluid flow position.
Figure 5:
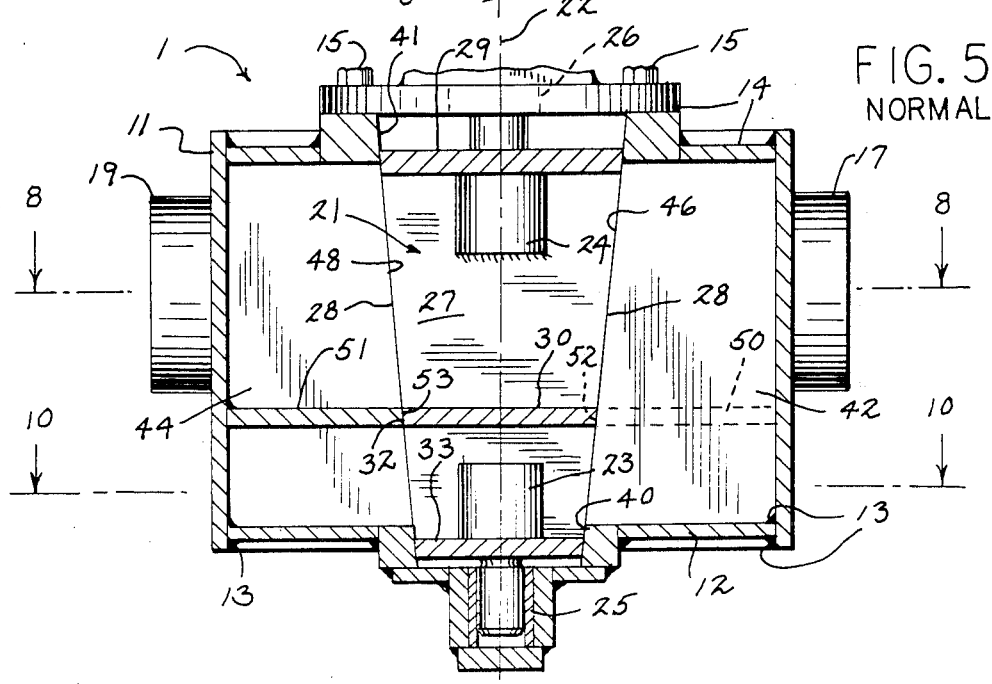
FIG. 5 is a vertical section taken on line 5—5 of FIG. 4.

The fluid flow diverter of valve 1 of the invention is shown schematically in FIG. 1 and may be utilized in connection with a process device such as a heat exchange condenser 2 having a plurality of tubes 3 therein. Diverter valve 1 normally supplies cooling water from a fluid source 4 such as a lake or the like and flow thereof is continuously generated by a pump 5. The diverter valve is connected to pump 5 and source 4 through a suitable fluid supply line 6, and also to source 4 by a suitable return line 7. A pair of lines 8 and 9 connect valve 1 to condenser 2 in the conventional manner. Diverter valve 1 is actuatable to reverse the flow in lines 8 and 9 so that tube cleaning brushes, not shown, can shuttle back and forth in condenser tubes 3 from time to time.

Turning first to FIG. 1, this drawing illustrates the suggested known prior art device described hereabove, which comprises a diverter valve 101 having a housing 102 including a cylindrical wall 103 closed at one end by a wall or plate 104 suitably secured thereto, and closed at its other end by a wall or plate 105 secured thereto as by bolts. Cylindrical wall 103 is provided with a pair of spaced upstream ports 106 and 107, and a pair of spaced downstream ports 109 and 109.

For purposes of diverting fluid flow through valve 101, a diverter assembly 110 is disposed for rotation about an axis within housing 102. Assembly 110 includes a tapered plug 111 which extends from one end of the assembly to the other. A pair of upper and lower annular transverse channel plates 112 and 113 respectively are mounted in axially spaced relation on the assembly, intermediate the ends of plug 111. Channel plates 112 and 113 are joined by axially extending channel walls 114 and 115 which, together with the plates and central portion of plug 111, form a pair of fluid flow channels 116 and 117.

A pair of transverse annular end plates 118 and 119 are spaced axially outwardly from the respective channel plates 112 and 113 with the outer end portions of plug 111 extending between the respective channel plates and end plates, thereby forming a pair of fluid flow chambers 120, 121 and 122, 123 axially outwardly from the ends of central channels 116 and 117.

When diverter assembly 110 is mounted for rotation within housing 102, the edges of end plates 118 and 119 engage sealing surfaces on housing end plates 105 and 104 respectively, in any suitable well-known manner.

The interior of housing 102 includes four circumferentially spaced axially extending cage bars 124–127 having tapered edges matching the tapered edges of plug 111. In addition, two pair of axially spaced opposing segmental platforms 128–131 are mounted between housing wall 103 and the adjacent cage bars and intermediate the ends of the valve. Platforms 128–131 are positioned with respective channel plates 112 and 113 so that their respective edges are fully sealingly abutting in both rotary positions of diverter assembly 110.

When assembly 110 was in its normal flow position with the edges of plug 111 engaging opposed cage bars such as 124 and 125, fluid would flow in through one of the upstream ports, such as 106, and pass through generally horizontally to a downstream discharge port 108. Return flow would enter downstream port 109 and pass through generally horizontally to upstream discharge port 107. However, when assembly 110 was rotated the usual about ¼ turn to its reverse flow position, fluid entering from a downsteam port, such as 108, would be forced to flow axially both upwardly and downwardly and hence through the pairs of dual end chambers 120, 121 and 122, 123 before returning axially to the upstream discharge port 107.

The tortuous splitting of fluid flow of the suggested known device into many flow paths at both ends of the diverter assembly would be disadvantageous in that there would be a high pressure drop through the valve. Furthermore, the large number of elements on housing 102 and assembly 110 would result in a heavy, costly structure, wherein many surfaces would tend to engage and resist freeing the diverter assembly for rotation between positions.

Figure 11:
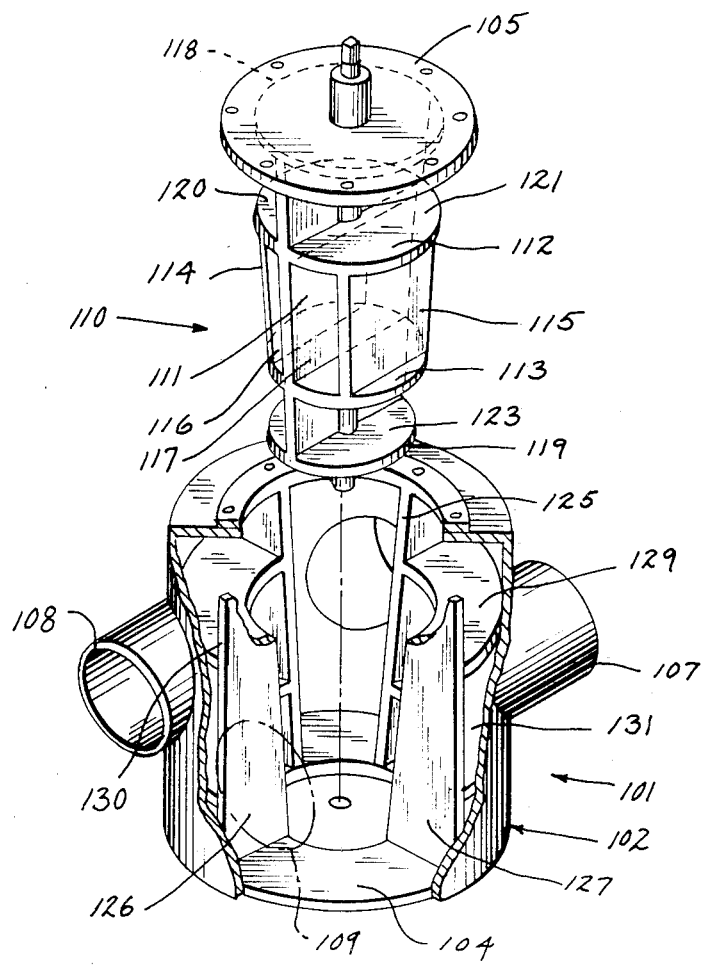
FIG. 11 is an exploded view of the known suggested prior art device, and essentially duplicates the aforementioned published drawing.

The various aspects of the present invention essentially solve or reduce the aforementioned and other problems found to exist in the suggested known diverter valve of FIG. 11.

Turning now to FIGS. 2-7, valve 1 of the invention is shown as having a housing 10 including a cylindrical wall 11 closed at one end by a wall 12 secured thereto as by welds 13, and closed at its other end by a wall 14 which is secured thereto as by bolts 15. The construction generally forms an internal valve chamber 16.

Cylindrical wall 11 is provided with a pair of spaced ports 17 and 18 which are upstream in the loop formed with fluid souce 4 and condenser 2 (see FIG. 1), and always function as supply and return ports respectively. Similarly, wall 11 includes a pair of spaced downstream ports 19 and 20 connected to lines 8 and 9 to condenser 2. As shown, the construction provides diametrically opposed in-line pairs of parts.

For purposes of diverting fluid flow through valve 1, a diverter assembly 21 is disposed within the valve housing for adjustable rotation about a longitudinal axis 22 which in turn is defined by a pair of stub axles 23 and 24 which are jounalled in respective bearings 25 and 26 on respective housing end walls 12 and 14. (See FIG. 5).

Assembly 21 includes a generally planular longitudinally extending central plug 27 having a pair of tapered edges 28 of about 5°. As shown, plug 27 is mounted to stub axles 23 and 24 and extends from one end of the assembly to the other. A pair of upper and lower channel plates 29 and 30 are mounted to the assembly transversely of plug 27. Upper channel plate 29 is disposed at one end of plug 27 and is generally annular, with a flat 31 on one side which is generally parallel to the plug. Lower channel plate 30 is disposed intermediate the plug ends and extends on either side thereof. Plate 30 is generally rectangular with one pair of opposed edges 31a extending linearly and parallel to plug 27, and the other pair of opposed edges 32 being segmental and arcuate.

A further, or end, plate 33 is disposed transversely of plug 27 and axis 22 and is spaced axially from lower or intermediate channel plate 30 on the side remote from upper channel plate 29. Each plate 33 is shown as being generally half-moon shaped.

In addition, diverter assembly 21 includes a pair of longitudinal generally flat channel walls 34 and 35 which are spaced transversely outwardly from plug 27 and are disposed in general parallelism to each other and to the plug. Channel wall 34 connects flat 31 on channel plate 29 with one of the flats 31a on channel plate 30. Channel wall 35 connects the side of channel plate 29 opposite flat 31 with the other flat 31a on channel plate 30. Walls 34 and 35 are provided with pairs of tapered edges 36 and 37 respectively. The result is to form a pair of side-by-side fluid flow channels 38 and 39 which are generally rectangular in configuration.

The interior of valve housing 10 is best illustrated in FIGS. 4–9. As shown, bottom and top housing walls 12 and 14 are provided with annular recesses having respective edges 40 and 41, with the recesses receiving end plate 33 and upper channel plate 29 of diverter assembly 21. The half-moon shape of end plate 33 and the flat 31 on upper channel plate 29 are such that the amount of abutting sliding surfaces during assembly rotation is reduced.

Four cage bars 42–45 are disposed within housing 10 and are circumferentially spaced to provide two pair of diametrically opposed bars. Cage bars 42–45 extend from end-to-end of the housing and are secured to cylindrical housing wall 11 and housing end walls 12 and 14 by any suitable means, such as welding. Cage bars 42–45 are provided with respective tapered inner edges 46–49 for purposes to be described, and divide housing chamber 16 into four circumferentially spaced axial extending quadrants I, II, III and IV. See FIG. 8.

In addition, a single pair of plate-like transverse planular segmental wedge-shaped platforms 50 and 51 are disposed in spaced relationship from bottom housing wall 12. Platform 50 is suitably mounted to cylindrical housing wall 11 and the faces of adjacent cage bars 42 and 43, while platform 51 is mounted to wall 11 and the faces of adjacent cage bars 44 and 45. Platforms 50 and 51 are co-planar and provided with respective radially inwardly facing concave edges 52 and 53 for purposes to be described.

When diverter assembly 21 is installed in housing 10 with stub axles 23 and 24 mounted in journal bearings 25 and 26, upper channel plate 29 is disposed closely adjacent housing top wall 14, end plate 33 is disposed closely adjacent housing bottom wall 12, and lower channel plate 30 is disposed intermediate the axial extent of the housing. Lower channel plate 30 is intended to be disposed co-planar with platforms 50 and 51.

Figure 7:
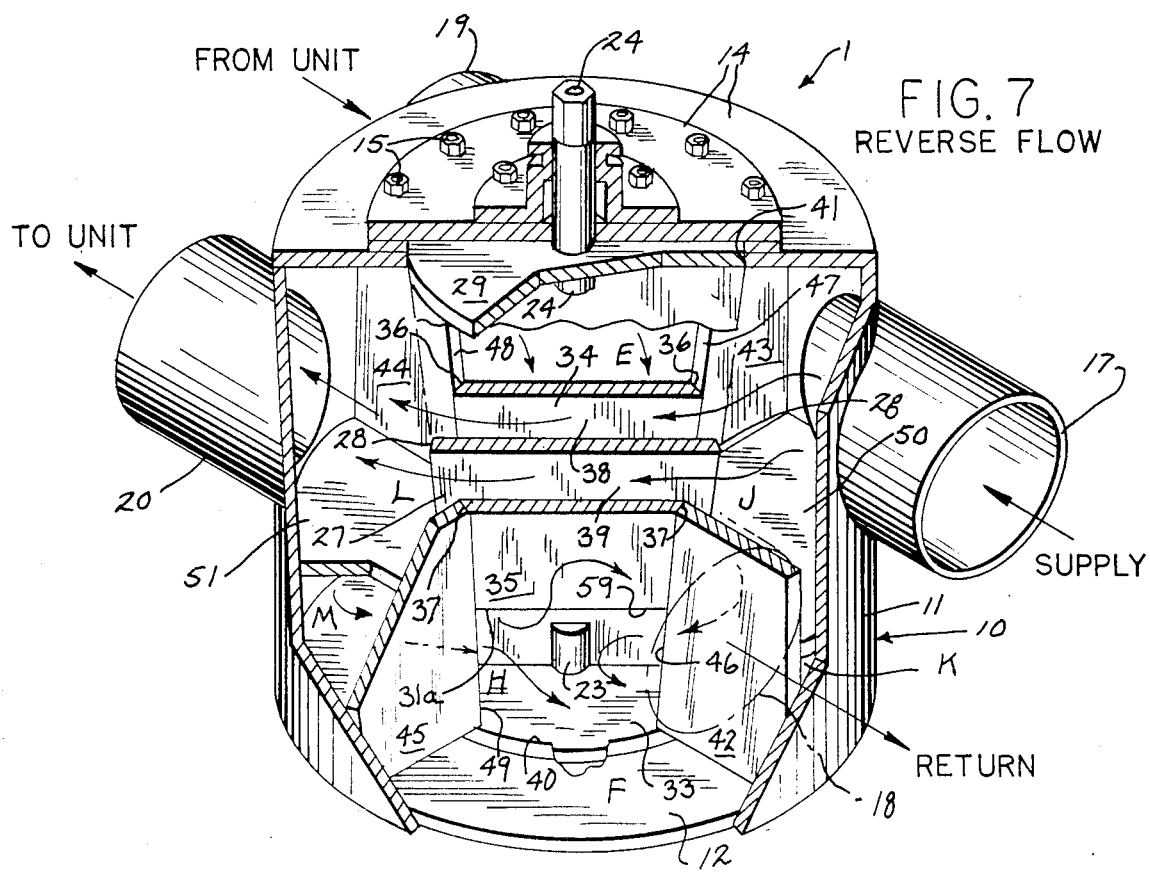
FIG. 7 is a perspective view similar to FIG. 6 and with the diverter assembly in reverse fluid flow position.
Figure 10:
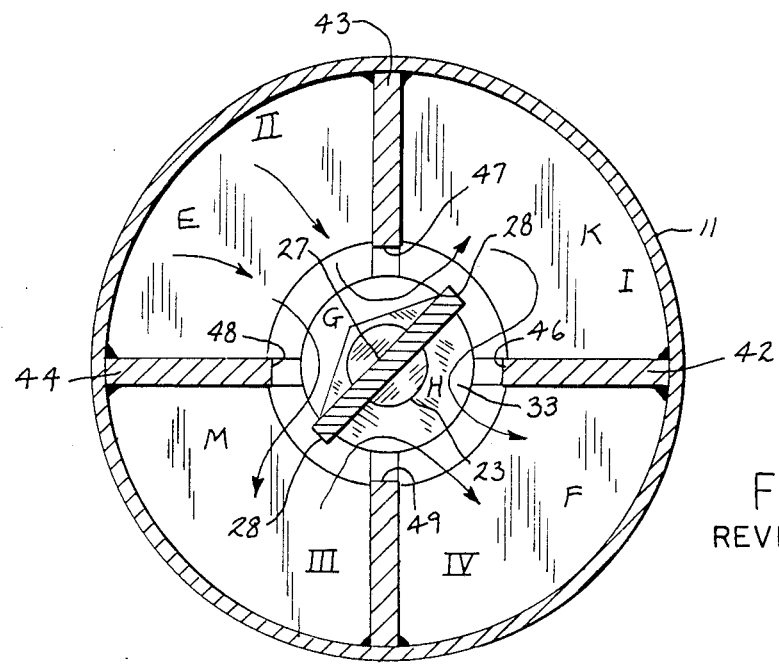
FIG. 10 is a sectional view taken on line 10—10 of FIG. 5, except with the assembly in reverse position.

Means are provided to rotate diverter assembly 21 between a normal position as shown in FIGS. 4, 5, 6 and 8; and a reverse position as shown in FIGS. 7, 9 and 10. For this purpose, and referring particularly to FIG. 4, upper stub shaft 24 has an outer extension 54 which extends beyond housing top wall 14. A pinion 55 is disposed on extension 54 and meshes with a rack 56 extending from an actuator 57 which has the usual cylinder with a piston and piston rod 58 connected to the rack. Actuation of piston rod 58 in the well-known manner causes diverter assembly 21 to rotate between normal and reverse positions as desired. Other suitable rotating means may be utilized without departing from the spirit of the invention.

When assembly 21 is disposed in its normal position, plug 27 is positioned co-planar with diametrically opposed cage bars 42 and 44 with the opposite plug edges 28 in sealing relationship with cage bar edges 46 and 48 from end-to-end of the housing. Axial channel walls 34 and 35 and their respective tapered edges are out of sealing relationship with any internal housing structure. Likewise, the arcuate end edges 32 of generally rectangular lower channel plate 30 are only partially adjacent the concave arcuate edges 52 and 53 of platforms 50 and 51 respectively so that no complete seal is effected. In effect, fluid flow paths are formed between the linear edges 31a of intermediate channel plate 30 and the opposed pair of cage bar edges 47 and 49. A portion of the platform edges 52, 53 are also freely exposed inwardly and free of the arcuate edges 32 of channel plate 30. The result is to form four chambers A, B, C and D which correspond with respective quadrants I, II, III and IV and also extend axially from end-to-end of housing 10. (See FIGS. 6 and 8). Adjacent chambers A, B and C, D on either side of the diametrical sealed wall formed by plug 27 and cage bars 42 and 44, communicate with each other and with their adjacent rectangular channels 38 and 39.

Fluid entering supply port 17 passes into chamber A and enters channel 38, and flows hence into chamber B, exiting channel 38. The fluid flows both above and below the level of lower channel plate 30 and platforms 50 and 51, and in a generally straight-through linear fashion. Finally, the fluid discharges through port 19 and hence to condenser 2. Fluid returning from the condenser enters port 20 and passes into chamber C and enters channel 39, and flows hence into chamber D, exiting channel 39. The flow direction is also generally linear. Finally, the fluid discharges through return port 18 and flows back to its source. As can be seen from FIGS. 6 and 8, the fluid flow is generally straight-through, but reversed in direction, on each side of plug 27.

Actuation of piston rod 58 causes diverter assembly 21 to rotate about 45° to its reverse position best shown in FIGS. 7, 9 and 10. In this position, the arcuate end edges 32 of generally rectangular lower or intermediate channel plate 30 are disposed in full sealing relationship with the respective concave arcuate edges 52, 53 of platforms 50 and 51. Likewise, the pairs of axially extending tapered edges 36 and 37 of respective channel walls 34 and 35 are in full sealing relationship with the pairs of respective adjacent cage bars 43, 44 and 45, 42 via the respective edges 47, 48 and 49, 46. Plug 27 is not sealed to the internal structure, although the plug edges 28 transversely intersect platform edges 52 and 53.

The result is to form a plurality of chambers positioned, oriented and connected differently than chambers A–D in the normal position. In the reverse position, a pair of diagonally opposed chambers E and F are formed which correspond with quadrants II and IV and similarly extend from end-to-end of housing 21. Chamber E is delineated by the cylindrical housing walls, the inner faces of adjacent cage bars 43, 44 and one axial channel wall 34. Chamber F is delineated by the housing walls, the inner faces of adjacent cage bars 45, 42 and the other axial channel wall 35. Since the lower terminus 59 of channel plate 30 is disposed in inwardly axially spaced relationship with housing bottom wall 12, the lower end portions of chambers E and F open radially inwardly to a central area beneath plate 30 which is divided by the lower extension of plug 27 into lower central chambers G and H which are also disposed in quadrants II and IV.

In addition, the parts are so positioned in the reverse mode that platform 50 in quadrant I sealingly cooperates with one arcuate end of plate 30 to form an upper chamber J which communicates with both channels 38 and 39; and also forms a lower or axial end chamber K therebeneath. Likewise, platform 51 in quadrant III cooperates with the other arcuate end of plate 30 to form an upper chamber L which also communicates with channels 38 and 39; and also forms a lower or axial end chamber M therebeneath. Chambers J and K are sealed from each other, as are chambers L and M.

Fluid entering upstream supply port 17 passes into upper chamber J, flows unidirectionally through both channels 38 and 39 and into upper chamber L, where it discharges through downstream port 20 and hence to condenser 2. Return fluid enters downstream port 19 and into axially extending chamber E, which it fills, and then enters lower central chamber G. (See FIG. 10). The fluid then flows around the exposed edges of the cage bars 43 and 44 into lower chambers K and M, around the exposed edges of plug 27 and finally through chamber H and into axial chamber F. From chamber F, the fluid discharges through return port 18. The construction illustrated in FIG. 10, which is below platforms 50 and 51 as well as rectangular channel plate 30, provides the sole fluid flow connection between one pair of upstream and downstream ports in the reverse mode. The crossover of fluid between opposing quadrants II and IV occurs entirely at one end of the valve, and is both generally clockwise and counterclockwise in direction.

It should be noted that ports 17–20 are all disposed in housing wall 11 above the plane containing channel plate 30 as well as platforms 50 and 51. Thus, in normal position of diverter assembly 21, upstream ports 17 and 18 register with axial chambers A and D, while downstream ports 19 and 20 register with axial chambers B and C respectively. In reverse assembly position, upstream port 17 registers with axial chamber J, upstream port 18 registers with inner chamber F, downstream port 19 registers with inner chamber E and downstream port 20 registers with axial chamber L. Furthermore, all return flow that traverses around the assembly axis 22 occurs in a single confined space at one end of the valve.

The construction described up to this point substantially lessens the parts required, reduces costs and pressure drop, and lightens the weight of the device, as compared with the suggested known valve. The surface area of facing moving parts during mode changing is also effectively reduced.

Figure 4A:
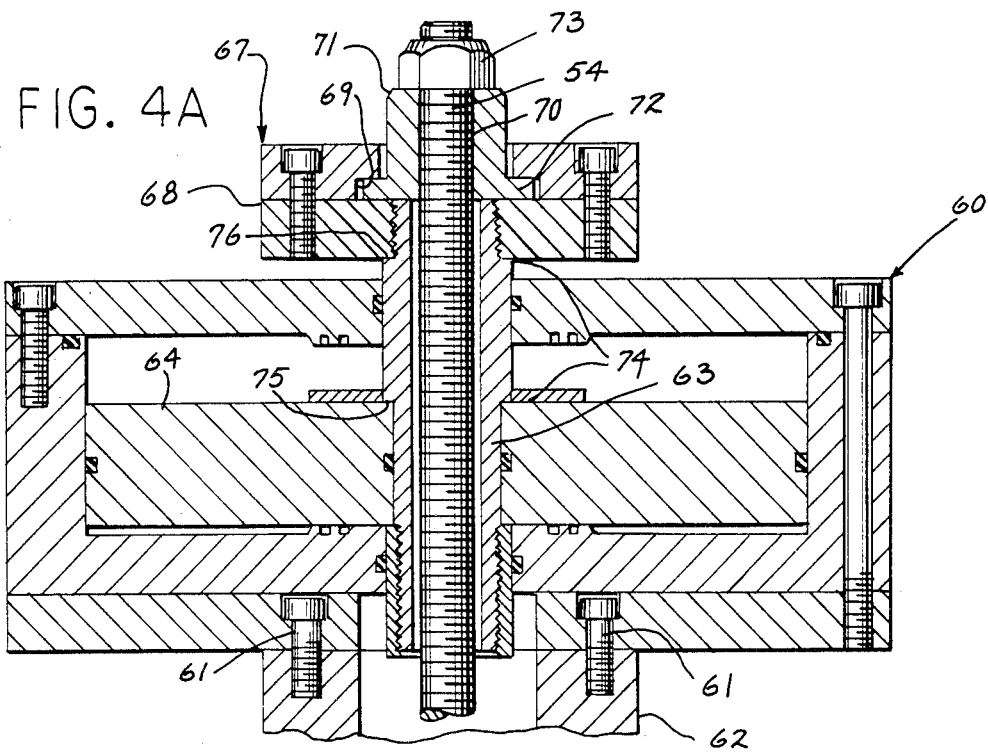
FIG. 4A is an enlarged sectional view showing the axial adjustment mechanism for the diverter assembly.

It is desired to be able to lift diverter assembly 21 axially by a small distance, such as 1", just prior to rotatable shifting thereof, and then return it to its desired working position. It is also desired to provide for a manual adjustment of the position of assembly 21 within housing 10 to provide a set tolerance, such as ¼", between edges which are to essentially abut and/or relatively slide during assembly rotation. For this purpose, and referring to FIGS. 2, 4 and 4A, stub axle extension 54 extends outwardly or upwardly beyond the diverter assembly rotator mechanism and passes through a pancake cylinder 60 which is fixedly mounted as by bolts 61 to a brace 62 which in turn is connected to top wall 14 of the valve. A sleeve 63 circumferentially surrounds extension 54 within cylinder 60 and is axially slideable therein. A piston 64 is disposed within cylinder 60 and is slideably mounted on sleeve 63. Cylinder 60 is connected to any suitable hydraulic actuating mechanism, as via ports 65 and 66.

Sleeve 63 extends upwardly beyond pancake cylinder 60 and is received within a fine adjustment assembly 67 which includes a housing 68 having a central bore with an enlarged internal groove 69 therein. Extension 54 extends outwardly beyond sleeve 63 and is threaded at least adjacent its outer end portion, as at 70. A fine adjustment actuator nut 71 is threadably mounted adjacent the sleeve end portion, with nut 71 having an annular flange 72 disposed in groove 69. A tightening nut 73 is threadably mounted to the sleeve end.

In addition, sleeve 63 is provided with an enlarged midportion 74 which forms a downwardly facing annular shoulder 75 disposed within pancake cylinder 60 above piston 64, and at its other end an upwardly facing annular shoulder 76 disposed outwardly of cylinder 60 and which engages fine adjustment assembly 67.

During initial installation of the diverter assembly 21 into valve housing 10, assembly 21 is lowered downwardly into housing 10 until its internal edges directly engage the edges formed by the internal housing parts, previously described. To prevent binding of the diverter assembly parts to the housing parts, a fine axial adjustment is then made to assembly 21 to lift it out of actual engaging contact with the housing parts. This is accomplished by loosening tightening nut 73 and threadably rotating adjustment nut 71 on extension 54 so that the latter is shifted axially outwardly, carrying assembly 21 with it. Nut 73 is then tightened. A small upward adjustment of assembly 21, such as about ¼", separates the respective parts within housing chamber 16. Because of the extremely large size of valve 1, such as five feet in diameter, the internal parts are still considered to be essentially sealed against any significant fluid flow therethrough, even with a set gap of about ¼".

When it is desired to lift diverter assembly 21 from its set adjusted position as described above, and rotate it between normal and reverse positions, pancake cylinder 60 is actuated to cause its piston 64 to rise. During this action, piston 64 engages lower sleeve shoulder 75, causing sleeve 63 to rise. Upper sleeve shoulder 76, which is in engagement with fine adjustment housing 68, raises the latter, carrying with it adjustment nut 71 and thus extension 54 to thereby lift diverter assembly 21 within valve housing 10.

The distance of stroke of pancake cylinder piston 64 is normally substantially greater, such as 1", than the fine adjustment distance, such as ¼", which is preset prior to valve operation. This assures free rotation of the various working parts of diverter assembly 21 relative to the various working parts of housing 10. After rotation of assembly 21 via actuator 57, piston 64 is lowered to thus allow assembly 21 to lower back to its working position with the pre-adjusted gap.

The positional relationships between the tapered edges 28 of plug 27 and the tapered edges 46, 48 of opposing cage bars 42, 44 when diverter assembly 21 is in normal position are considered to be of substantial importance for proper functioning of valve 1 due to the higher pressure on the supply side of the valve in chambers A and B and channel 34, than on the other return side in normal mode. For this reason, the fine pre-setting adjustment discussed above is usually made with assembly 21 in normal position to provide the desired optimum clearance or gap between the plug and cage bar pair. It is believed that the other parts will basically take care of themselves.

By the same token, it is believed that the positional relationships between the arcuate edges 32 of channel plate 30 and the arcuate edges 52, 53 of platforms 50, 51 when diverter assembly 21 is in reverse position are also of substantial importance for proper functioning of the valve, since upper chambers L and J need to be substantially isolated from lower chambers M and K in reverse mode. For this reason, the thicknesses of the edges of channel plate 30 relative to the edges 52, 53 of platforms 50, 51 must be such that, with the overall pre-set gap set in normal mode by reference to plug 27 and cage bars 42, 44, channel plate edges 30 and platform edges 52, 53 will remain in essential sealing relationship in reverse mode. That is, at least a portion of each edge 32 is to remain in the same transverse plane as the edge 52 or 53 which it faces when assembly 21 is in reverse position.

Figure 12A:
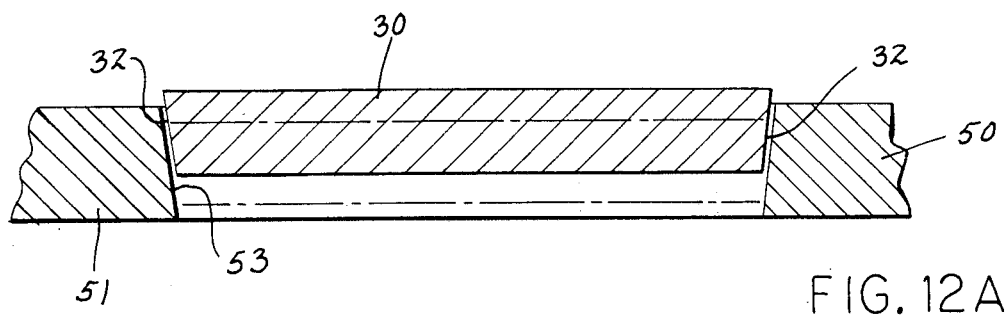
FIG. 12A schematically illustrates the intermediate channel plate and segmental platforms, with the edges thereof having a proper relationship.
Figure 12B:
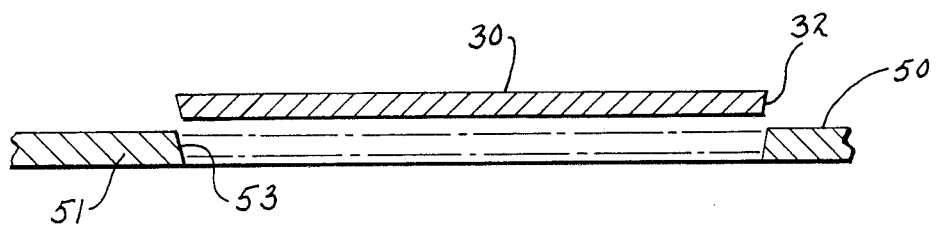
FIG. 12B is similar to FIG. 12A, with an undesirable relationship.
Figure 6:
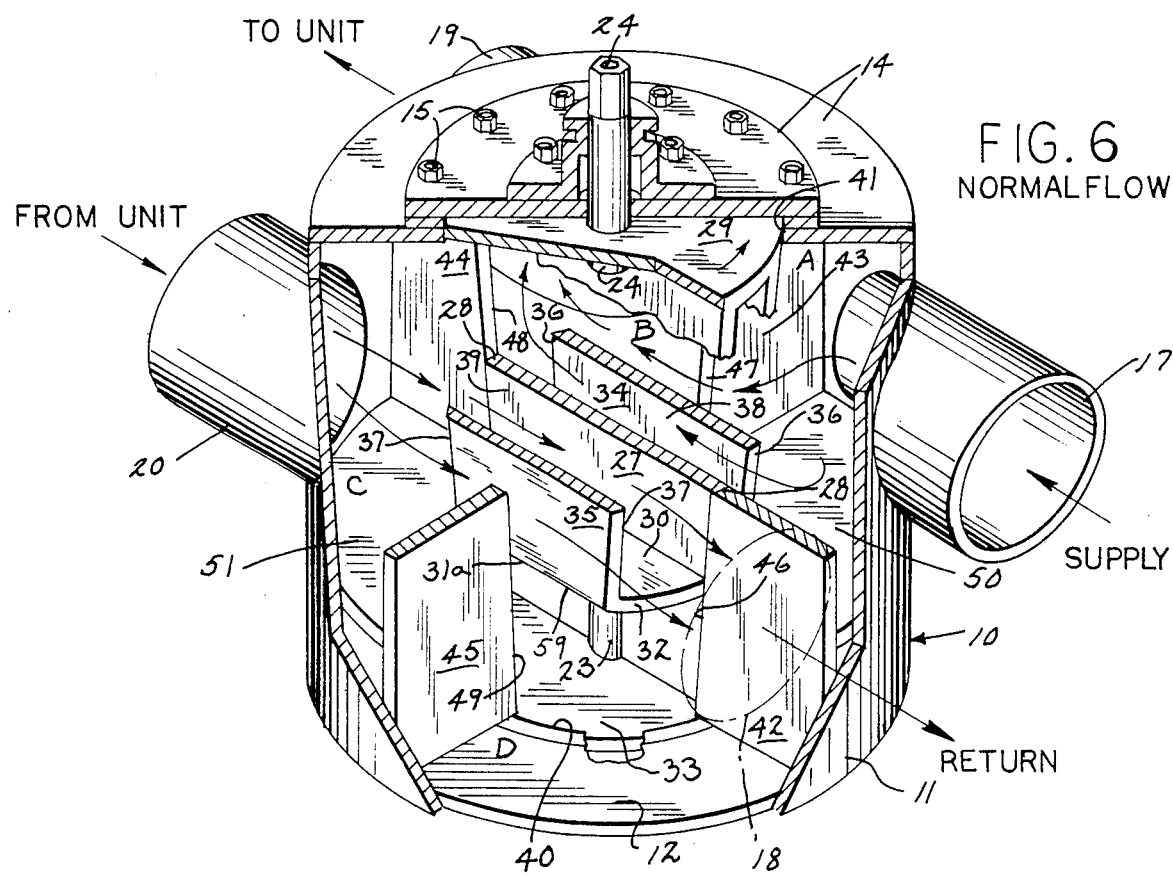
FIG. 6 is a persepective view of the valve with the diverter assembly in normal fluid flow position, with parts broken away and in section.

FIG. 12A illustrates the above concept wherein channel plate 30 is disposed relative to platforms 50 and 51 and before the pre-set axial adjustment, in phantom lines. The position of plate 30 after the pre-set adjustment is shown in full lines. Note that the edges 32 of plate 30 remain in facing relationship with edges 52, 53 of the platforms. In this embodiment, the facing relationship is partial, although a full facing relationship is of course also possible and probably desirable. FIG. 12B illustrates the undesirable situation wherein plate 30 has been shifted from its phantom line position prior to pre-setting adjustment, to the full line position after the axial pre-set. In this situation, plate edges 32 are no longer in a transverse plane containing platform edges 52, 53. Here, the seal has been totally lost and substantial fluid flow can occur between the facing edges. The importance of the relative dimensional thickness relationships between plate edges 32 and platform edges 52, 53, which are also dependent on the amount of axial shift in presetting assembly 21 is clearly illustrated in these views.

If desired, valve 1 may be reversed or even inverted in the fluid flow lines without departing from the spirit of the invention.

Various modes of carrying out the invention are contemplated as being within the scope of the following claims particularly pointing out and distinctly claiming the subject matter which is regarded as to the invention.

I claim:

1. A fluid flow reversing diverter valve (1) for connection between a source of pressurized fluid (4) and a process device (2), comprising, in combination:
   (a) an enclosed housing (10) having a longitudinal axially extending generally cylindrical side wall (11) and first and second end walls (12, 14),
   (b) a pair of spaced parallel upstream supply and return ports (17, 18) disposed in said housing side wall for connection to the fluid source,
   (c) a pair of spaced parallel downstream output and input ports (19, 20) disposed in said housing side wall for connection to the process device,
   (d) said housing (10) further including:
      (1) four cage bars (42–45) disposed therewithin and with said cage bars being circumferentially spaced to provide first and second pairs (42, 44–43, 45) of diametrically opposed bars, said cage bars having inner edges (46–49) and extending longitudinally from end to end of said housing to thereby divide the latter into quadrants (I–IV),
      (2) a single pair of segmental wedge-shaped co-planar platforms (50, 51) disposed transversely within said housing and connected to said cylindrical side wall (11) and the faces of respective adjacent cage bars (42, 43–44, 45) and spaced axially from said first housing end wall (12), said platforms having diametrically opposed inner edges (52, 53) and being disposed in two of said quadrants (I, III),
   (e) a diverter assembly (21) disposed within said housing for rotation between a first and second position about a longitudinal axis (22) so that fluid entering said supply port (17) may be selectively directed to either of said downstream ports and so that fluid returning through either of said downstream ports is discharged through said return port (18), said assembly including:
      (1) a generally planular longitudinally extending central plug (27) having a pair of edges (28) thereon,
      (2) a pair of transverse longitudinally spaced channel plates (29, 30), one said channel plate (29) being disposed closely adjacent said second housing end wall (14) and the other said channel plate (30) being disposed intermediate the ends of said plug (27) and closely adjacent said platforms (50, 51),
      (3) said intermediate channel plate (30) being generally rectangular and having a first pair of opposed edges (31a) which extend linearly and generally parallel to said plug, and having a second pair of opposed segmental arcuate edges (32) facing said platform edges (52, 53),
      (4) a pair of longitudinal channel walls (34, 35) spaced transversely outwardly from said plug (27) and generally parallel thereto, said channel walls having respective pairs of edges (36, 37) and connecting said linear edges (31a) of said intermediate channel plate (30) with the other said channel plate (29) and thereby forming a pair of side-by-side rectangular fluid flow channels (38, 39),
      (5) and a single transverse end plate (33) spaced longitudinally outwardly from said intermediate channel plate (30) on the side remote from the said other channel plate (29) and disposed closely adjacent said first housing wall (12),
   (f) means (54–58) to selectively rotate said diverter assembly (21) between said first (FIGS. 6, 8) and second (FIGS. 7, 9) positions,
   (g) the construction being such that when said diverter assembly (21) is in said first position,
      (1) fluid flow paths are formed between said linear edges (31a) of said intermediate channel plate (30) and an opposed pair of said cage bar edges (47, 49),
      (2) a portion of said platform edges (52, 53) are freely exposed inwardly and free of said intermediate channel plate edges (32),
      (3) and the edges (28) of said plug (27) are in sealing relationship with the edges (46, 48) of said first pair of cage bars (42, 44),
   (h) the construction further being such that when said diverter assembly (21) is in said second position,
      (1) the said arcuate end edges (32) of said intermediate channel plate (30) are disposed in full sealing relationship with said arcuate edges (52, 53) of said platforms (50, 51),
      (2) and said pairs of edges (36, 37) of said respective channel walls (34, 35) being in full sealing relationship with the respective edges (47, 48–49, 46) of respective adjacent cage bars (43, 44–45, 42),
   (i) fine adjustment means (67) connected to said diverter assembly (21) to axially pre-set the latter so that the said edges (28) of said plug (27) are in a desired positional pre-set sealing relationship relative to the said edges (46, 48) of said first pair of cage bars (42, 44) when said assembly is in said first position,
   (j) the relative thicknesses of said arcuate edges (32) of said intermediate channel plate (30) relative to the edges (52, 53) of said platforms (50, 51) being such that when said diverter assembly (21) has been axially preset and is in said second position, at least a portion of said last-named plate edges (32) are disposed in the same transverse plane as said platform edges (52, 53) so that the sealing relationship between said last-named plate and platform edges (32–52, 53) is maintained (FIG. 12A).

2. A fluid flow reversing diverter valve (1) for connection between a source of pressurized fluid (4) and a process device (2), comprising, in combination:
   (a) an enclosed housing (10) having a longitudinal axially extending generally cylindrical side wall (11) and first and second end walls (12, 14),
   (b) a pair of spaced parallel upstream supply and return ports (17, 18) disposed in said housing side wall for connection to the fluid source, (c) a pair of spaced parallel downstream output and input ports (19, 20) disposed in said housing side wall for connection to the process device, (d) said housing (10) further including:
  (1) four cage bars (42–45) disposed therewithin and with said cage bars being circumferentially spaced to provide first and second pairs (42, 44–43, 45) of diametrically opposed bars, said cage bars having inner edges (46–49) and extending longitudinally from end to end of said housing to thereby divide the latter into quadrants (I–IV),
  (2) a single pair of segmental wedge-shaped co-planar platforms (50, 51) disposed transversely within said housing and connected to said cylindrical side wall (11) and the faces of respective adjacent cage bars (42, 43–44, 45) and spaced axially from said first housing end wall (12), said platforms having diametrically opposed inner edges (52, 53) and being disposed in two of said quadrants (I, III), (e) a diverter assembly (21) disposed within said housing for rotation between a first and second position about a longitudinal axis (22) so that fluid entering said supply port (17) may be selectively directed to either of said downstream ports and so that fluid returning through either of said downstream ports is discharged through said return port (18), said assembly including:
  (1) a generally planular longitudinally extending central plug (27) having a pair of edges (28) thereon,
  (2) a pair of transverse longitudinally spaced channel plates (29, 30), one said channel plate (29) being disposed closely adjacent said second housing end wall (14) and the other said channel plate (30) being disposed intermediate the ends of said plug (27) and closely adjacent said platforms (50, 51),
  (3) said intermediate channel plate (30) being generally rectangular and having a first pair of opposed edges (31a) which extend linearly and generally parallel to said plug, and having a second pair of opposed segmental arcuate edges (32) facing said platform edges (52, 53),
  (4) a pair of longitudinal channel walls (34, 35) spaced transversely outwardly from said plug (27) and generally parallel thereto, said channel walls having respective pairs of edges (36, 37) and connecting said linear edges (31a) of said intermediate channel plate (30) with the other said channel plate (29) and thereby forming a pair of side-by-side rectangular fluid flow channels (38, 39),
  (5) and a single transverse end plate (33) spaced longitudinally outwardly from said intermediate channel plate (30) on the side remote from the said other channel plate (29) and disposed closely adjacent said first housing wall (12), (f) means (54–58) to selectively rotate said diverter assembly (21) between said first (FIGS. 6, 8) and second (FIGS. 7, 9) positions, (g) the construction being such that when said diverter assembly (21) is in said first position,
  (1) fluid flow paths are formed between said linear edges (31a) of said intermediate channel plate (30) and an opposed pair of said cage bar edges (47, 49),
  (2) a portion of said platform edges (52, 53) are freely exposed inwardly and free of said intermediate channel plate edges (32),
  (3) and the edges (28) of said plug (27) are in sealing relationship with the edges (46, 48) of said first pair of cage bars (42, 44), (h) the construction further being such that when said diverter assembly (21) is in said second position,
  (1) the said arcuate end edges (32) of said intermediate channel plate (30) are disposed in full sealing relationship with said arcuate edges (52, 53) of said platforms (50, 51),
  (2) and said pairs of edges (36, 37) of said respective channel walls (34, 35) being in full sealing relationship with the respective edges (47, 48–49, 46) of respective adjacent cage bars (43, 44–45, 42).

3. The diverter valve of claim 2 wherein, when said diverter assembly (21) is in said first position (FIGS. 6, 8):
  (a) said plug (27) and said first pair of cage bars (42, 44) form a diametrical sealed wall within said housing (10),
  (b) four chambers (A–D) are formed which correspond respectively with said quadrants (I–IV) and which extend axially from end-to-end of said housing and communicate with said ports (17, 19, 20, 18),
  (c) and adjacent last-named chambers (A, B–C, D) communicate with each other and with their adjacent said rectangular fluid flow channels (38, 39).

4. The diverter valve of claim 2 or 3 wherein, when said diverter assembly (21) is in said second position (FIGS. 7, 9):
  (a) two diagonally opposed port-connected chambers (E, F) are formed corresponding with two of said quadrants II, IV) and extend axially from end-to-end of said housing (10),
  (b) the lower end portions of said opposed chambers (E, F) opening radially inwardly past the lower terminus (59) of said intermediate channel plate (30) to a central area disposed between said last-named plate (30) and said first housing end wall (12),
  (c) said central area being divided into lower opposed central chambers (G, H) by said plug (27) which communicate with opposed lower outer chambers (K, M),
  (d) said platforms (50, 51) partially delineating said lower outer chambers (K, M),
  (e) said central chambers (G, H) and said lower outer chambers (K, M) forming the sole fluid flow connection between said last-named diagonally opposed axially extending chambers (E, F).

5. The diverter valve of claim 4 wherein, when said diverter assembly (21) is in said second position, (FIGS. 7, 9): when fluid enters one of said opposed central chambers (G) from one of said last-named axially extending chambers (E), it flows both clockwise and counterclockwise around said edges of said cage bars, (43, 44) and into said lower outer chambers (K, M) and hence around said plug (27) and through the other of said opposed central chambers (H) and into the other of said last-named axially extending chamber (F) for discharge from the valve (FIG. 10).

6. A fluid flow reversing diverter valve (1) for connection between a source of pressurized fluid (4) and a process device (2), comprising, in combination:

(a) an enclosed housing (10) having a longitudinal axially extending generally cylindrical side wall (11) and first and second end walls (12, 14),
(b) a pair of spaced parallel upstream supply and return ports (17, 18) disposed in said housing side wall for connection to the fluid source,
(c) a pair of spaced parallel downstream output and input ports (19, 20) disposed in said housing side wall for connection to the process device,
(d) said housing (10) further including:
  (1) four cage bars (42-45) disposed therewithin and with said cage bars being circumferentially spaced to provide first and second pairs (42, 44-43, 45) of diametrically opposed bars, said cage bars having inner edges (46-49) and extending longitudinally from end to end of said housing to thereby divide the latter into quadrants (I-IV),
  (2) a single pair of segmental wedge-shaped co-planar platforms (50, 51) disposed transversely within said housing and connected to said cylindrical side wall (11) and the faces of respective adjacent cage bars (42, 43-44, 45) and spaced axially from said first housing end wall (12), said platforms having diametrically opposed inner edges (52, 53) and being disposed in two of said quadrants (I, III),
(e) a diverter assembly (21) disposed within said housing for rotation between a first and second position about a longitudinal axis (22) so that fluid entering said supply port (17) may be selectively directed to either of said downstream ports and so that fluid returning through either of said downstream ports is discharged through said return port (18), said assembly including:
  (1) a generally planular longitudinally extending central plug (27) having a pair of edges (28) thereon,
  (2) a pair of transverse longitudinally spaced channel plates (29, 30), one said channel plate (30) being disposed intermediate the ends of said plug (27) and closely adjacent said platforms (50, 51),
  (3) said intermediate channel plate (30) having arcuate edges (32) facing said platform edges (52, 53),
(f) means (54-58) to selectively rotate said diverter assembly (21) between said first (FIGS. 6, 8) and second (FIGS. 7, 9) positions,
(g) the construction being such that when said diverter assembly (21) is in said first position,
  (1) the edges (28) of said plug (27) are in sealing relationship with the edges (46, 48) of said first pair of cage bars (42, 44),
(h) the construction further being such that when said diverter assembly (21) is in said second position,
  (1) the said edges (32) of said intermediate channel plate (30) are disposed in full sealing relationship with said arcuate edges (52, 53) of said platforms (50, 51),
(i) fine adjustment means (67) connected to said diverter assembly (21) to axially pre-set the latter so that the said edges (28) of said plug (27) are in a desired positional pre-set sealing relationship relative to the said edges (46, 48) of said first pair of cage bars (42, 44) when said assembly is in said first position,
(j) the relative thicknesses of said arcuate edges (32) of said intermediate channel plate (30) relative to the edges (52, 53) of said platforms (50, 51) being such that when said diverter assembly (21) has been axially preset and is in said second position, at least a portion of said last-named plate edges (32) are disposed in the same transverse plane as said platform edges (52, 53) so that the sealing relationship between said last-named plate and platform edges (32-52, 53) is maintained (FIG. 12A).

* * * * *

UNITED STATES PATENT AND TRADEMARK OFFICE
CERTIFICATE OF CORRECTION

PATENT NO. : 4,653,537
DATED : March 31, 1987
INVENTOR(S) : DONALD J. VOITH

It is certified that error appears in the above-identified patent and that said Letters Patent is hereby corrected as shown below:

In Column 5, line 3, delete "1" and insert --11--.

In Column 5, line 11, delete the first occurrence of "109" and insert --108--.

In Column 6, line 18, delete "parts" and insert --ports--.

In Column 6, line 43, delete "Each" and insert --End--.

Signed and Sealed this

Twenty-fifth Day of August, 1987

Attest:

DONALD J. QUIGG

*Attesting Officer*    *Commissioner of Patents and Trademarks*